United States Patent
Shen et al.

(10) Patent No.: US 8,942,080 B2
(45) Date of Patent: Jan. 27, 2015

(54) TRANSMISSION OF BUNDLED ACK/NAK BITS

(75) Inventors: Zukang Shen, Richardson, TX (US);
Tarik Muharemovic, Dallas, TX (US);
Eko Nugroho Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1047 days.

(21) Appl. No.: 12/425,612

(22) Filed: Apr. 17, 2009

(65) Prior Publication Data
US 2010/0210256 A1   Aug. 19, 2010

Related U.S. Application Data

(60) Provisional application No. 61/086,834, filed on Aug. 7, 2008, provisional application No. 61/075,061, filed on Jun. 24, 2008, provisional application No. 61/048,733, filed on Apr. 29, 2008, provisional application No. 61/046,538, filed on Apr. 21, 2008, provisional application No. 61/045,730, filed on Apr. 17, 2008.

(51) Int. Cl.
| H04J 11/00 | (2006.01) |
| H04L 1/16 | (2006.01) |
| H04L 5/02 | (2006.01) |
| H04L 1/18 | (2006.01) |

(52) U.S. Cl.
CPC ............. *H04L 1/1621* (2013.01); *H04L 5/023* (2013.01); *H04L 1/1614* (2013.01); *H04L 1/1692* (2013.01); *H04L 1/1812* (2013.01); *H04L 1/1854* (2013.01)

USPC .......................................................... 370/208

(58) Field of Classification Search
CPC ........................................................ H04L 5/023
USPC .......................................................... 370/208
See application file for complete search history.

(56) References Cited

U.S. PATENT DOCUMENTS

| 3,665,113 | A * | 5/1972 | Blake et al. ................... 379/359 |
| 2008/0232307 | A1* | 9/2008 | Pi et al. ......................... 370/328 |
| 2009/0154333 | A1* | 6/2009 | Sivaswamy et al. .......... 370/203 |
| 2011/0239074 | A1* | 9/2011 | Kim et al. ..................... 714/748 |
| 2011/0261729 | A1* | 10/2011 | Ahn et al. ..................... 370/280 |
| 2012/0020315 | A1* | 1/2012 | Astely et al. .................. 370/329 |

* cited by examiner

*Primary Examiner* — Mark Rinehart
*Assistant Examiner* — Christopher R Crompton
(74) *Attorney, Agent, or Firm* — Ronald O. Neerings; Frederick J. Telecky, Jr.

(57) ABSTRACT

This invention is applicable to wireless communication between a user equipment (UE) and a base station using frames where at least one uplink (UL) is assigned a subframe to respond to a plurality of DL assigned subframes. This invention is an improvement in the acknowledge (ACK) or non-acknowledge (NAK) response by the UE. The UE generates an ACK or NAK dependent upon whether a DL communication is correctly received. For an UL subframe assigned to respond to communications on plural DL subframes, the UE logically combines plural ACK/NAK responses into a single bundled response for transmission to the base station. This logical combining produces a bit in a first digital state if all said responses are ACKs and in a second opposite digital state if any response is a NAK.

16 Claims, 5 Drawing Sheets

TRANSMISSION OF BUNDLED ACK/NAK BITS

CLAIM OF PRIORITY

This application claims priority under 35 U.S.C. 119(e)(1) to U.S. Provisional Application No. 61/045,730 filed Apr. 17, 2008, U.S. Provisional Application No. 61/046,538 filed Apr. 21, 2008, U.S. Provisional Application No. 61/048,733 filed Apr. 29, 2008, U.S. Provisional Application No. 61/075,061 filed Jun. 24, 2008 and U.S. Provisional Application No. 61/086,834 filed Aug. 7, 2008.

TECHNICAL FIELD OF THE INVENTION

The technical field of this invention is transmission of control signals in wireless telephony.

BACKGROUND OF THE INVENTION

Figure 1:
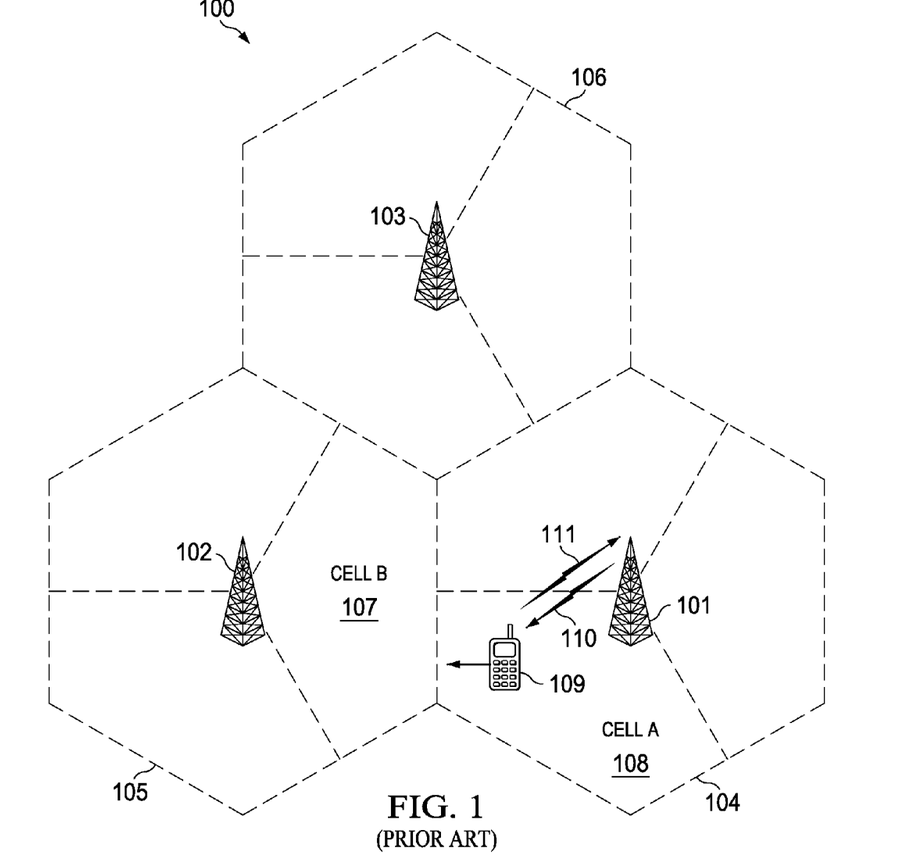
FIG. 1 is a diagram of a communication system of the prior art related to this invention having three cells.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Figure 2:
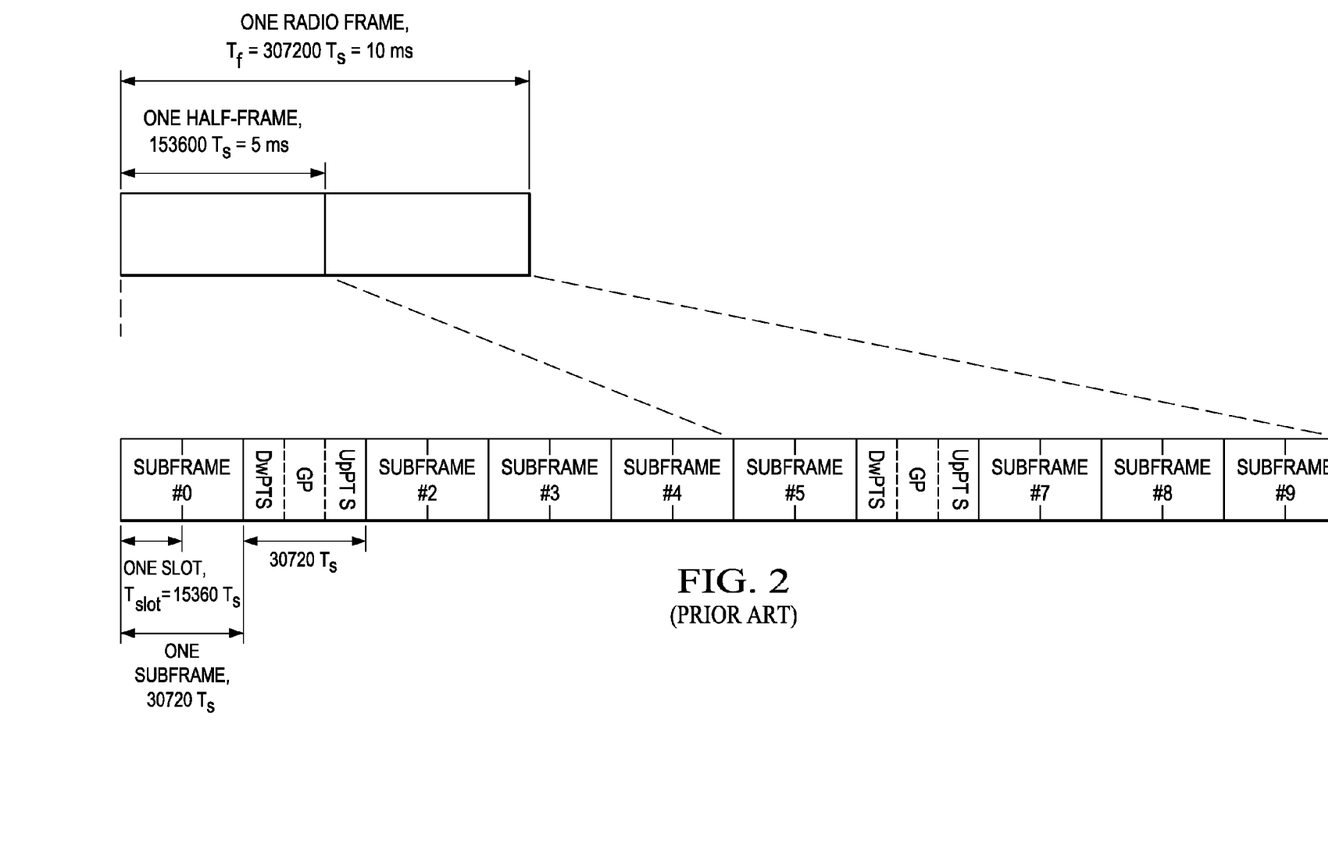
FIG. 2 shows the Evolved Universal Terrestrial Radio Access (E-UTRA) TDD Frame Structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Con-figuration | Switch-point periodicity | Subframe number | | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

One interesting property of TDD is that the number of UL and DL subframes can be different. In the configurations where there are more DL subframes than UL subframes, multiple DL subframes are associated with one single UL subframe for transmission of corresponding control signal. For example, for each dynamically scheduled transmission in the DL subframes, acknowledge and non-acknowledge (ACK/NAK) bits need to be transmitted in an associated UL subframe to support proper hybrid automatic repeat request (HARQ) operation. If UE 109 is scheduled in a multiple of DL subframes all of which are associated with one single UL subframe, UE 109 needs to transmit multiple ACK/NAK bits in that single UL subframe.

SUMMARY OF THE INVENTION

This invention is applicable to wireless communication between a user equipment (UE) and a base station using frames where at least one uplink (UL) is assigned a subframe to respond to a plurality of DL assigned subframes. This invention is an improvement in the acknowledge (ACK) or non-acknowledge (NAK) response by the UE. The UE generates an ACK or NAK dependent upon whether a DL communication is correctly received. For an UL subframe assigned to respond to communications on plural DL subframes, the UE logically combines plural ACK/NAK responses into a single bundled response for transmission to the base station. This logical combining produces a bit in a first digital state if all responses are ACKs and in a second opposite digital state if any response is a NAK.

BRIEF DESCRIPTION OF THE DRAWINGS

These and other aspects of this invention are illustrated in the drawings, in which.

DETAILED DESCRIPTION OF PREFERRED EMBODIMENTS

In 3GPP (Third Generation Partnership Project) Long Term Evolution (LTE), an UL subframe can be associated with 1, 2, 3, 4, or 9 DL subframes. Thus it is possible to have 18 ACK/NAK bits in one UL subframe depending on the number of data streams in the DL transmissions.

The basic design principle of this invention transmits multiple ACK/NAK bits on one of the ACK/NAK channels that UE has correctly received the DL packets using physical uplink control channel (PUCCH) format 1a or 1b. Using this invention requires no additional PUCCH resource to be reserved for the transmission of multiple ACK/NAK bits. In accordance with this invention plural such ACK/NAK bits may be combined or bundled for transmission.

This invention proposes several design rules for multiple ACK/NAK transmission.

Rule 1: The maximum number of multiple ACK/NAK bits of one UE in an UL subframe is 4.

Rule 2: UEs employing DL Multiple Input, Multiple Output (MIMO) operation bundle the ACK/NAK bits associated with multiple data streams into a single ACK/NAK bit.

Rule 3: When one UL subframe is associated with nine DL subframes, UEs bundles the ACK/NAK bits in the first four or five DL subframes into 1 or 2 bits, then bundle the ACK/NAK bits in the last five or four DL subframes into the 1 or 2 ACK/NAK bits. The bundling selection depends on whether DL transmission mode is either single input, multiple output (SIMO) or MIMO.

Table 2 lists the multiple ACK/NAK transmission configurations of this invention.

TABLE 2

| Number of DL subframes associated with one UL subframe | Number of ACK/NAK bits | |
| --- | --- | --- |
| | SIMO | MIMO |
| 1 | 1 | 2 |
| 2 | 2 | 4 |
| 3 | 3 | 3 |
| 4 | 4 | 4 |
| 9 | 2 | 4 |

For UEs having one associated DL subframe, the same ACK/NAK transmission as in frequency division duplex (FDD) can be used with physical uplink control channel (PUCCH) format 1a or 1b. For UEs having two associated DL subframes, the invention supports explicit transmission of either 2 or 4 ACK/NAK. It is also possible to have 3 ACK/NAK bits in one UL subframe having two associated DL subframes. In this case the transmission of one DL subframe is SIMO and the other is MIMO. For UEs having three or four associated DL subframes, the ACK/NAK bits corresponding to MIMO transmission in any DL subframe are bundled into one ACK/NAK bit. This reduces the maximum number of multiple ACK/NAK bits. When one UL subframe is associated with nine DL subframes, UEs bundle the ACK/NAK bits in the first four or five DL subframes into 1 or 2 bits, then bundle the ACK/NAK bits in the last five or four DL subframes into the 1 or 2 ACK/NAK bits. The bundling selection depends on whether DL transmission mode is either SIMO or MIMO.

Figure 3A:
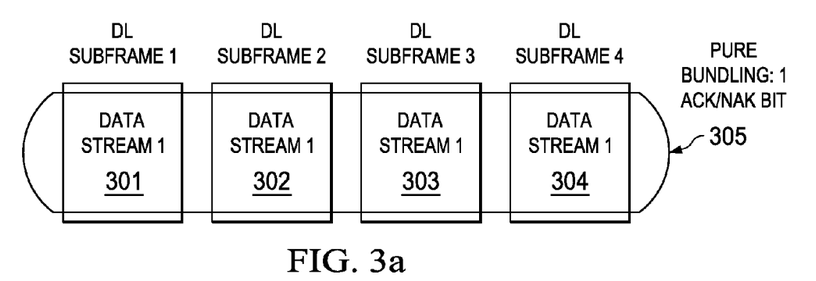
FIG. 3 shows the case of pure bundling for multiple ACK/NAK bits are bundled into 1 or 2 bits.
Figure 3B:
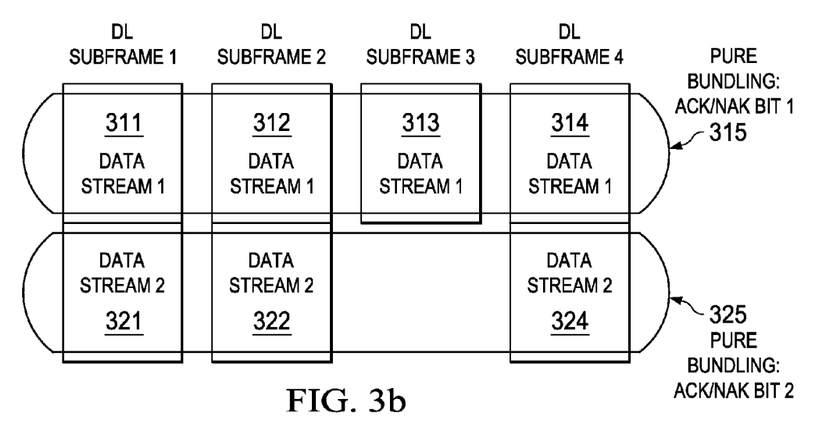

FIG. 3 shows the case of pure bundling, where the multiple ACK/NAK bits are bundled into 1 or 2 bits, depending on the number of DL spatial codewords. The manner of bundling depends upon the coding of the ACK/NAK bit. These plural bits are combined so that a single NAK toggles the bundled bit. Thus if ACK=1 and NAK=0, the individual ACK/NAK bits are ANDed to produce the bundled bit. A single NAK would cause a 0 result interpreted as a NAK. If ACK=0 and NAK=1, the individual ACK/NAK bits are ORed to produce the bundled bit. A single NAK would cause a 1 result interpreted as a NAK. In either case all ACKs result in a combined ACK/NAK having a first digital state and any NAK results in a combined ACK/NAK having an opposite second digital state. FIG. 3a illustrates bundling the ACK/NAK response to four data streams including data stream 301 of DL subframe 1, data stream 302 of DL subframe 2, data stream 303 of DL subframe 3 and data stream 304 of DL subframe 4 into a single ACK/NAK bit 305. FIG. 3b illustrates bundling when the data streams have differing length. The data transmitted in DL subframe 1 includes data stream 311 and data stream 321. The data transmitted in DL subframe 2 includes data stream 312 and data stream 322. The data transmitted in DL subframe 3 includes only data stream 313. The data transmitted in DL subframe 4 includes data stream 313 and data stream 324. A first bit 315 of the bundled ACK/NAK combines individual ACK/NAK bits for data stream 1 of DL subframes 1, 2, 3 and 4. A second bit 325 of the bundled ACK/NAK combines individual ACK/NAK bits for data stream 2 of DL subframes 1, 2 and 4.

Figure 4:
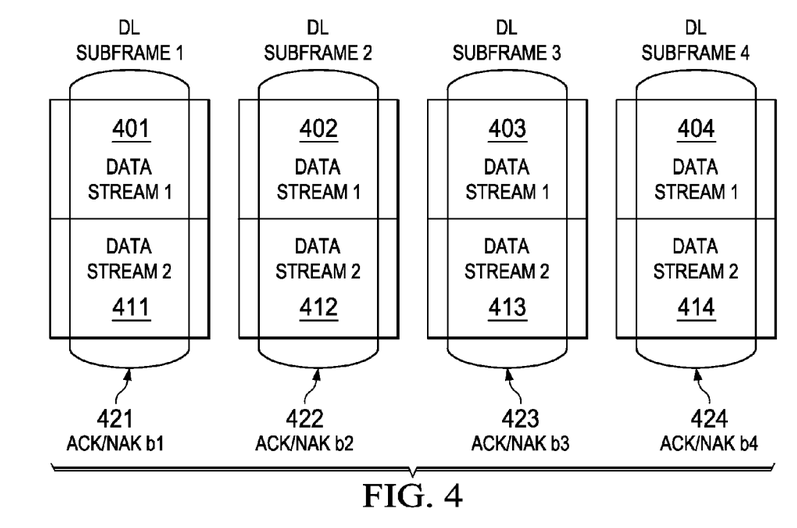
FIG. 4 illustrates an example of spatial sub-bundling for a DL to UL subframe ratio of 4.

FIG. 4 illustrates an example of spatial sub-bundling for a DL to UL subframe ratio of 4. In this example ACK/NAK sub-bundling is performed across MIMO (spatial multiplexing) codewords per DL subframe. Data in DL subframe 1 including data stream 401 and data stream 411 are bundled in ACK/NAK bit 421. Data in DL subframe 2 including data stream 402 and data stream 412 are bundled in ACK/NAK bit 422. Data in DL subframe 3 including data stream 403 and data stream 413 are bundled in ACK/NAK bit 423. Data in DL subframe 4 including data stream 404 and data stream 414 are bundled in ACK/NAK bit 424.

This invention supports ACK/NAK bundling to enable coverage. A disadvantage is that ACK/NAK bundling generally causes unnecessary retransmission. All packets in the bundling window are retransmitted if there is one packet received incorrectly. This is required because the base station cannot determine which DL transmission in the ACK/NAK bundle was incorrectly received and generate a NAK response. Thus ACK/NAK bundling across system reduces DL throughput. Therefore TDD should support both multiple ACK/NAK transmission and ACK/NAK bundling. This invention proposes details of a method for multiple ACK/NAK transmission in TDD.

As noted in Table 2, a UE can transmit 2, 3, or 4 ACK/NAK bits in one UL subframe. This invention includes detailed schemes for such transmission.

In the following description the ACK/NAK bits are denoted as $(b_1, b_2, \ldots, b_n)$, where n=2, 3, or 4. The ACK/NAK channels associated with different DL subframes are denoted as $(h_1, h_2, \ldots, h_n)$, where n=2, 3, or 4. A bit $b_i$ is the ACK/NAK bit of the i-th DL subframe corresponding to the same UL subframe. A channel $h_i$ is the ACK/NAK channel for the i-th DL subframe corresponding to the same UL subframe. Table 3 shows one example of QPSK symbols. Note that "j" is the complex number $\sqrt{-1}$. Other QPSK symbol mappings are possible.

TABLE 3

| QPSK | Symbols |
| --- | --- |
| $Q_1$: 00 | −1 |
| $Q_2$: 01 | j |
| $Q_3$: 10 | −j |
| $Q_4$: 11 | 1 |

Table 4 lists an example coding of two bits $(b_1, b_2)$ when the ACK/NAK bits are transmitted on two channels.

TABLE 4

| $b_2 b_1$ | (A/N Channel, QPSK symbol) |
|---|---|
| 0, 0 | $(h_2, Q_1)$ |
| 0, 1 | $(h_2, Q_2)$ |
| 1, 0 | $(h_1, Q_3)$ |
| 1, 1 | $(h_1, Q_4)$ or DTX |

Table 5 lists an example coding of three bits ($b_1$, $b_2$, $b_3$) when the ACK/NAK bits are transmitted on three channels.

TABLE 5

| $b_3 b_2 b_1$ | (A/N Channel, QPSK symbol) |
|---|---|
| 0, 0, 0 | $(h_3, Q_1)$ |
| 0, 0, 1 | $(h_3, Q_2)$ |
| 0, 1, 0 | $(h_3, Q_3)$ |
| 0, 1, 1 | $(h_3, Q_4)$ |
| 1, 0, 0 | $(h_2, Q_1)$ |
| 1, 0, 1 | $(h_2, Q_4)$ |
| 1, 1, 0 | $(h_1, Q_1)$ |
| 1, 1, 1 | $(h_1, Q_4)$ or DTX |

Table 6 lists an example coding of four bits ($b_1$, $b_2$, $b_3$, $b_4$) when the ACK/NAK bits are transmitted on four channels.

TABLE 6

| $b_4 b_3 b_2 b_1$ | (A/N Channel, QPSK symbol) |
|---|---|
| 0, 0, 0, 0 | $(h_2, Q_1)$ |
| 0, 0, 0, 1 | $(h_2, Q_3)$ |
| 0, 0, 1, 0 | $(h_4, Q_1)$ |
| 0, 0, 1, 1 | $(h_4, Q_3)$ |
| 0, 1, 0, 0 | $(h_1, Q_2)$ |
| 0, 1, 0, 1 | $(h_4, Q_2)$ |
| 0, 1, 1, 0 | $(h_1, Q_3)$ |
| 0, 1, 1, 1 | $(h_4, Q_4)$ |
| 1, 0, 0, 0 | $(h_3, Q_1)$ |
| 1, 0, 0, 1 | $(h_3, Q_2)$ |
| 1, 0, 1, 0 | $(h_3, Q_3)$ |
| 1, 0, 1, 1 | $(h_3, Q_4)$ |
| 1, 1, 0, 0 | $(h_2, Q_2)$ |
| 1, 1, 0, 1 | $(h_2, Q_4)$ |
| 1, 1, 1, 0 | $(h_1, Q_1)$ |
| 1, 1, 1, 1 | $(h_1, Q_4)$ or DTX |

Tables 4 to 6 illustrate examples only and other mapping scheme are possible. These examples assume that a 0 represents ACK and a 1 represents NAK or DTX. Note a DTX indicates that the UE missed DL grant in that DL subframe. The notation of ($h_i$, $Q_j$) indicates transmitting QPSK symbol $Q_j$ on ACK/NAK channel $h_i$. DTX and NAK are treated similarly.

Tables 4 to 6 illustrate sub-bundling across MIMO codewords, for DL/UL ratio of 3 or 4. Thus there is one ACK/NAK bit per DL subframe. When a UE produces an ACK (in this example 0) on DL subframe j, then the UE must have decoded the corresponding DL grant correctly. Therefore, the ACK/NAK channel $h_j$ corresponding to DL subframe j is always available. When using MIMO operation, the UE can derive two ACK/NAK channels corresponding to a DL subframe. Alternatively stated, a DL grant for MIMO operation consists of at least two control channel elements (CCEs). Therefore, for MIMO operation, there could be multiple ACK/NAK channels from the one DL subframe.

When the ACK/NAK bundles all 1s, that is for any combination of at least one DTX or NAK, the UE has two options.

The UE can transmit ACK/NAK DTX by transmitting nothing. Alternatively the UE can transmit a QPSK symbol on ACK/NAK channel 1 if available.

For concurrent transmission of multiple ACK/NAK bits and a channel quality indicator (CQI), the UE bundles all ACK/NAK bits into 1 or 2 ACK/NAK bits. The UE uses the concurrent transmission scheme of bundled ACK/NAK and CQI.

For concurrent transmission of multiple ACK/NAK bits and SRI, the UE bundles all ACK/NAK bits into 1 or 2 ACK/NAK bits. The UE uses the concurrent transmission scheme of bundled ACK/NAK and SRI.

The UE may use Downlink Assignment Index (DAI) to infer whether it missed any DL grant in the bundling window. When the UE detects that it misses at least one DL grant, it can transmit DTX by transmit nothing.

DTX and NAK share a common state in this invention. This limits the maximum number of ACK/NAK bits and improves the transmission reliability. Thus the all 0 case in Tables 4 to 6 represents several DTX/NAK combinations.

Tables 7 to 9 illustrate alternative examples of the codings listed in Tables 4 to 6. Table 7 lists another example coding of two bits ($b_2$, $b_2$) when the ACK/NAK bits are transmitted on two channels.

TABLE 7

| $b_2 b_1$ | (A/N Channel, QPSK symbol) |
|---|---|
| 0, 0 | $(h_2, Q_1)$ |
| 0, 1 | $(h_2, Q_4)$ |
| 1, 0 | $(h_1, Q_3)$ |
| 1, 1 | $(h_1, Q_2)$ or DTX |

Table 8 lists another example coding of three bits ($b_1$, $b_2$, $b_3$) when the ACK/NAK bits are transmitted on three channels.

TABLE 8

| $b_3 b_2 b_1$ | (A/N Channel, QPSK symbol) |
|---|---|
| 0, 0, 0 | $(h_3, Q_1)$ |
| 0, 0, 1 | $(h_3, Q_2)$ |
| 0, 1, 0 | $(h_3, Q_3)$ |
| 0, 1, 1 | $(h_3, Q_4)$ |
| 1, 0, 0 | $(h_2, Q_1)$ |
| 1, 0, 1 | $(h_2, Q_4)$ |
| 1, 1, 0 | $(h_1, Q_3)$ |
| 1, 1, 1 | $(h_1, Q_2)$ or DTX |

Table 9 lists another example coding of four bits ($b_1$, $b_2$, $b_3$, $b_4$) when the ACK/NAK bits are transmitted on four channels.

TABLE 9

| $b_4 b_3 b_2 b_1$ | (A/N Channel, QPSK symbol) |
|---|---|
| 0, 0, 0, 0 | $(h_2, Q_1)$ |
| 0, 0, 0, 1 | $(h_2, Q_4)$ |
| 0, 0, 1, 0 | $(h_4, Q_1)$ |
| 0, 0, 1, 1 | $(h_4, Q_3)$ |
| 0, 1, 0, 0 | $(h_1, Q_2)$ |
| 0, 1, 0, 1 | $(h_4, Q_2)$ |
| 0, 1, 1, 0 | $(h_1, Q_3)$ |
| 0, 1, 1, 1 | $(h_4, Q_4)$ |
| 1, 0, 0, 0 | $(h_3, Q_1)$ |
| 1, 0, 0, 1 | $(h_3, Q_2)$ |
| 1, 0, 1, 0 | $(h_3, Q_3)$ |

TABLE 9-continued

| $b_4 b_3 b_2 b_1$ | (A/N Channel, QPSK symbol) |
|---|---|
| 1, 0, 1, 1 | $(h_3, Q_4)$ |
| 1, 1, 0, 0 | $(h_2, Q_2)$ |
| 1, 1, 0, 1 | $(h_2, Q_3)$ |
| 1, 1, 1, 0 | $(h_1, Q_1)$ |
| 1, 1, 1, 1 | $(h_1, Q_4)$ or DTX |

Table 10 shows the supported number of ACK/NAK bits, for different DL/UL ratios in another embodiment. The maximum number of multiple ACK/NAK bits is 4. For DL MIMO mode with a DL to UL ratio of 3 or 4, ACK/NAK sub-bundling reduces the number of multiple ACK/NAK bits. This invention included 2 states for each ACK/NAK bit. These are an ACK and a NAK/DTX. For the DL subframes in which the UE does not detect DL grant, NAK is transmitted for the corresponding DL subframes.

TABLE 10

| Number of DL subframes associated with one UL subframe | Maximum number of ACK/NAK bits | | | |
|---|---|---|---|---|
| | Non-spatial multiplexing | | Spatial multiplexing | |
| | Pure Bundling | No Bundling | Pure Bundling | Spatial Sub-bundling |
| 2 | 1 | 2 | 2 | 2 |
| 3 | 1 | 3 | 2 | 3 |
| 4 | 1 | 4 | 2 | 4 |
| 9 | 1 | 4 | 2 | 4 |

Table 11 lists an example coding of two bits ($b_1$, $b_2$) when the ACK/NAK bits are transmitted on two channels.

TABLE 11

| $b_2 b_1$ | (A/N Channel, QPSK symbol) |
|---|---|
| 1, 1 | $(h_2, Q_1)$ |
| 1, 0 | $(h_2, Q_4)$ |
| 0, 1 | $(h_1, Q_3)$ |
| 0, 0 | DTX |

Table 12 lists an example coding of three bits ($b_2$, $b_2$, $b_3$) when the ACK/NAK bits are transmitted on three channels.

TABLE 12

| $b_3 b_2 b_1$ | (A/N Channel, QPSK symbol) |
|---|---|
| 1, 1, 1 | $(h_3, Q_1)$ |
| 1, 1, 0 | $(h_3, Q_2)$ |
| 1, 0, 1 | $(h_3, Q_3)$ |
| 1, 0, 0 | $(h_3, Q_4)$ |
| 0, 1, 1 | $(h_2, Q_1)$ |
| 0, 1, 0 | $(h_2, Q_4)$ |
| 0, 0, 1 | $(h_1, Q_3)$ |
| 0, 0, 0 | DTX |

Table 13 lists an example coding of four bits ($b_1$, $b_2$, $b_3$, $b_4$) when the ACK/NAK bits are transmitted on four channels.

TABLE 13

| $b_4 b_3 b_2 b_1$ | (A/N Channel, QPSK symbol) |
|---|---|
| 1, 1, 1, 1 | $(h_2, Q_1)$ |
| 1, 1, 1, 0 | $(h_2, Q_4)$ |
| 1, 1, 0, 1 | $(h_4, Q_1)$ |
| 1, 1, 0, 0 | $(h_4, Q_3)$ |
| 1, 0, 1, 1 | $(h_1, Q_2)$ |
| 1, 0, 1, 0 | $(h_4, Q_2)$ |
| 1, 0, 0, 1 | $(h_1, Q_3)$ |
| 1, 0, 0, 0 | $(h_4, Q_4)$ |
| 0, 1, 1, 1 | $(h_3, Q_1)$ |
| 0, 1, 1, 0 | $(h_3, Q_2)$ |
| 0, 1, 0, 1 | $(h_3, Q_3)$ |
| 0, 1, 0, 0 | $(h_3, Q_4)$ |
| 0, 0, 1, 1 | $(h_2, Q_2)$ |
| 0, 0, 1, 0 | $(h_2, Q_3)$ |
| 0, 0, 0, 1 | $(h_1, Q_1)$ |
| 0, 0, 0, 0 | DTX |

Tables 11 to 13 illustrate examples only and other mapping scheme are possible. These examples assume that a 1 represents ACK and a 0 represents NAK or DTX.

Figure 5:
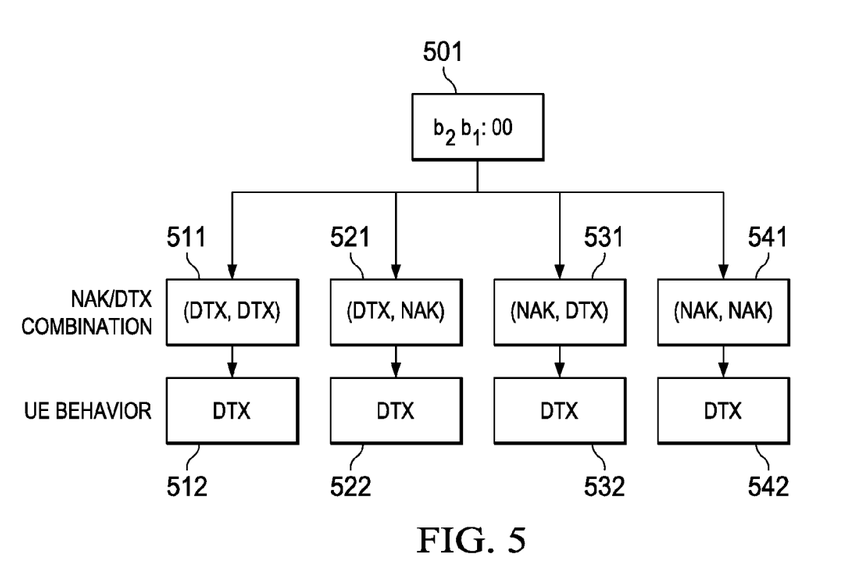
FIG. 5 illustrates possible DTX/NAK combinations for the case of a DL to UL ratio of 2.

FIG. 5 illustrates possible DTX/NAK combinations for the case of a DL to UL ratio of 2. According to Table 11, the UE behavior is to transmit DTX, that is to transmit nothing, for the 00 case. FIG. 5 illustrates an alternative UE behavior. The coding 00 501 represents four combinations. The first combination 511 is (DTX, DTX). The UE responds by transmitting a DTX signal 521. The second combination 512 is (DTX, NAK). The UE responds by transmitting DTX 522. The third combination 513 is (NAK, DTX). The UE responds by transmitting DTX 523. The fourth combination 514 is (NAK, DTX). The UE responds by transmitting DTX 524. Essentially, UE transmits in the ACK/NAK channel corresponding to a DL subframe where DL grant is detected but physical downlink shared channel (PDSCH) is incorrectly decoded. In other words, the probability of UE transmitting DTX is reduced, with the expense that the number of hypothesis testing is slightly increased at NodeB.

Figure 6:
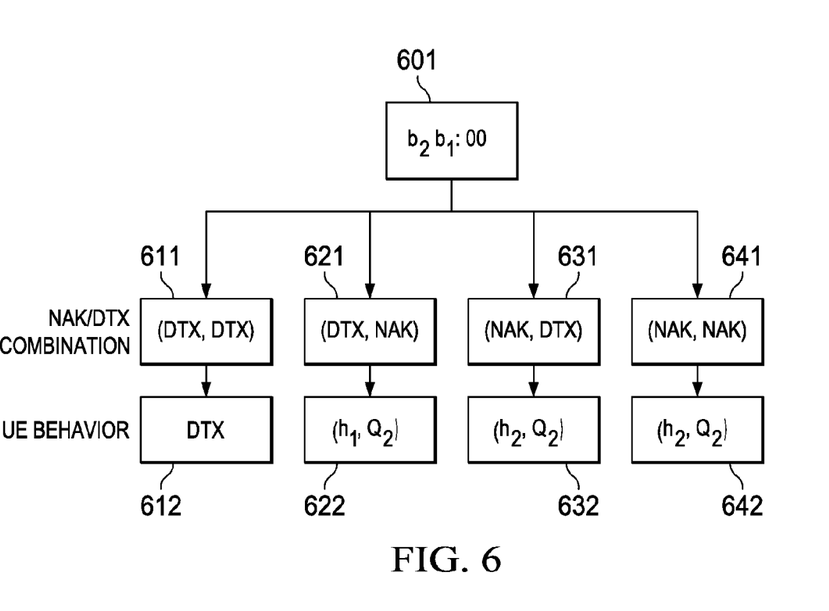
FIG. 6 illustrates another possible set of DTX/NAK combinations for the case of a DL to UL ratio of 2.

FIG. 6 illustrates another possible set of DTX/NAK combinations for the case of a DL to UL ratio of 2. FIG. 6 illustrates a further alternative UE behavior to Table 11. The coding 00 601 represents four combinations. The first combination 611 is (DTX, DTX). The UE responds by transmitting a DTX signal 621. The second combination 612 is (DTX, NAK). The UE responds by transmitting ($h_1$, $Q_1$) 622. The third combination 613 is (NAK, DTX). The UE responds by transmitting ($h_2$, $Q_2$) 623. The fourth combination 614 is (NAK, DTX). The UE responds by transmitting ($h_2$, $Q_2$) 624. Based on FIG. 6, Table 11 can be revised as Table 14.

TABLE 14

| $b_2 b_1$ | (A/N Channel, QPSK symbol) |
|---|---|
| 1, 1 | $(h_2, Q_1)$ |
| 1, 0 | $(h_2, Q_4)$ |
| 0, 1 | $(h_1, Q_3)$ |
| 0, 0 | DTX or $(h_1, Q_2)$ or $(h_2, Q_2)$ |

Figure 7:
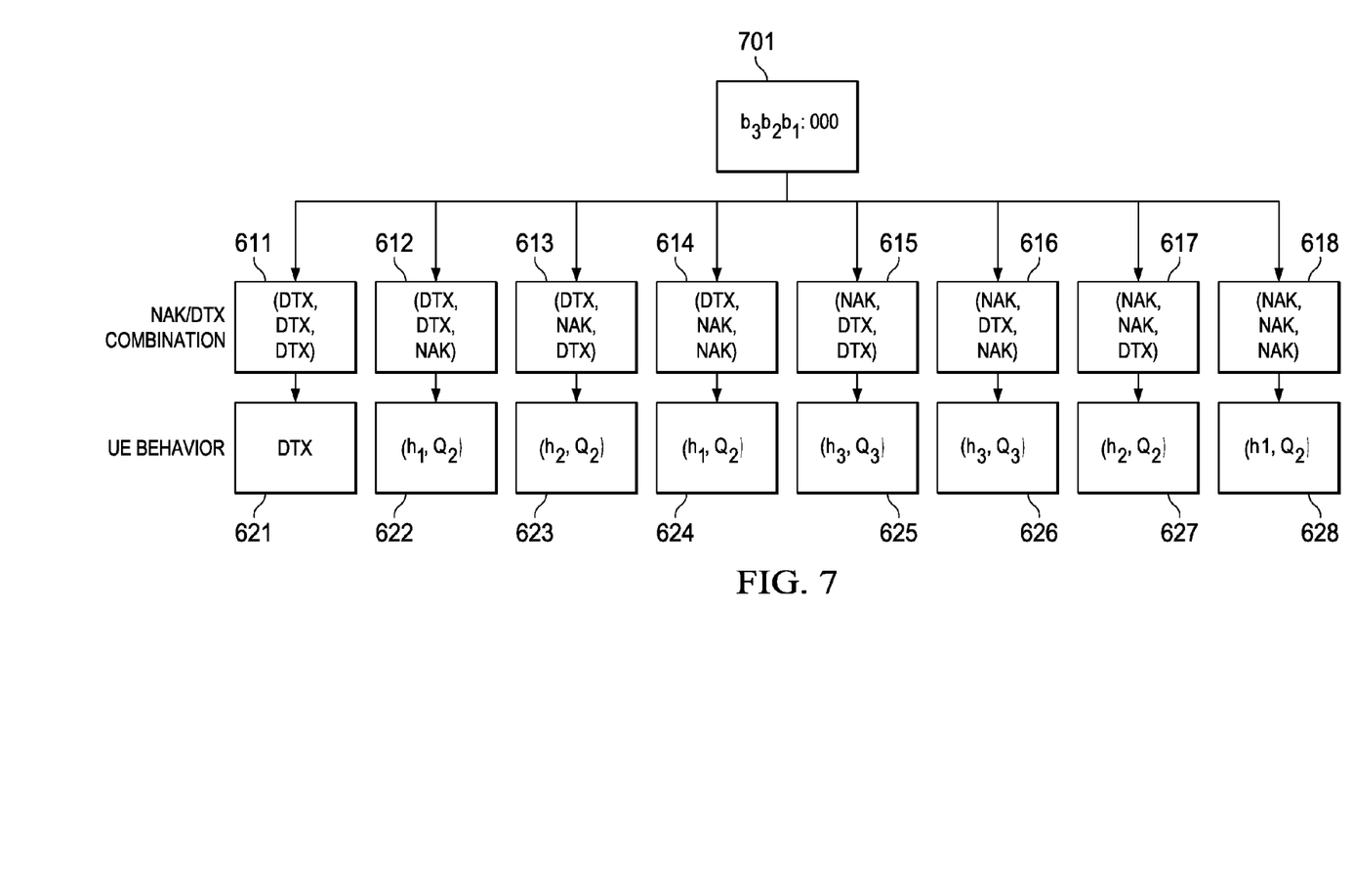
FIG. 7 illustrates possible DTX/NAK combinations for the case of a DL to UL ratio of 3.

FIG. 7 illustrates possible DTX/NAK combinations for the case of a DL to UL ratio of 3. According to Table 12, the UE behavior is to transmit DTX, that is to transmit nothing, for the 00 case. FIG. 7 illustrates an alternative UE behavior. The coding 000 701 represents eight combinations. The first combination 711 is (DTX, DTX, DTX). The UE responds by transmitting a DTX signal 721. The second combination 712 is (DTX, DTX, NAK). The UE responds by transmitting a ($h_1$, $Q_2$) signal 722. The third combination 713 is (DTX, NAK, DTX). The UE responds by transmitting a ($h_2$, $Q_2$) signal 723. The fourth combination 714 is (DTX, NAK, NAK). The UE responds by transmitting a ($h_1$, $Q_2$) signal 724. The fifth combination 715 is (NAK, DTX, DTX). The UE responds by transmitting a ($h_3$, $Q_3$) signal 725. The sixth combination 716 is (NAK, DTX, NAK). The UE responds by transmitting a ($h_3$, $Q_3$) signal 726. The seventh combination 717 is (NAK, NAK, DTX). The UE responds by transmitting a ($h_2$, $Q_2$) signal 727. The eighth combination 718 is (NAK, NAK, NAK). The UE responds by transmitting a ($h_1$, $Q_2$) signal 728. Based on FIG. 7, Table 12 can be revised as Table 15.

TABLE 15

| $b_3 b_2 b_1$ | (A/N Channel, QPSK symbol) |
|---|---|
| 1, 1, 1 | ($h_3$, $Q_1$) |
| 1, 1, 0 | ($h_3$, $Q_2$) |
| 1, 0, 1 | ($h_1$, $Q_1$) |
| 1, 0, 0 | ($h_3$, $Q_4$) |
| 0, 1, 1 | ($h_2$, $Q_1$) |
| 0, 1, 0 | ($h_2$, $Q_4$) |
| 0, 0, 1 | ($h_1$, $Q_3$) |
| 0, 0, 0 | DTX or ($h_1$, $Q_2$) or ($h_2$, $Q_2$) or ($h_3$, $Q_3$) |

The ACK/NAK transmission mode in TDD is UE specific and RRC configured. Each UE is semi-statically configured between non-spatial multiplexing mode and spatial multiplexing mode for its DL transmissions. For a non-spatial multiplexing UE, its ACK/NAK transmission is further configured between pure bundling and no bundling. For a spatial multiplexing UE, its ACK/NAK transmission is further configured between pure bundling and spatial sub-bundling.

In 3GPP LTE, a UE can bundle the multiple ACK/NAK bits corresponding to multiple DL subframes into 1 or 2 ACK/NAK bits, and transmit the bundled ACK/NAK bits in the ACK/NAK channel associated with the last detected DL subframe. The detection of last DL grant miss replies on the ACK/NAK channel on which the bundled ACK/NAK bits are transmitted. When a UE needs to transmit both CQI and bundled ACK/NAK bits in the same UL subframe, the CQI resource is used. Thus detection of last DL grant miss is not supported. This invention proposes a few schemes to support the detection of last DL grant miss when UE has concurrent transmission of ACK/NAK and CQI in TDD.

Transmitting multiple ACK/NAK bits greater than 2 in one UL subframe is also possible to minimize the throughput loss due to bundling. A number of assigned DL subframes may be grouped into multiple bundling groups. For example, up to 4 DL subframes may correspond to one UL subframe for each UE in TDD configurations 2 and 4. If a UE receives DL-SCH transmission in 4 DL subframes and must respond to the 4 assignments in one UL subframe, the UE may bundle the UL ACK/NAK bits into 2 bundles. Each bundle is associated with 2 DL subframes. Up to 4 bits of ACK/NAK are needed when greater than 1-layer transmission is used in all the DL assignments. This invention address issues of multiple ACK/NAK transmission.

In LTE TDD, there could be 1, 2, 3, 4, or 9 DL subframes associated with one UL subframe. Therefore, the number of ACK/NAK bits to be transmitted in the UL subframe can be 1, 2, 3, 4, 6, 8, 9, or 18. Supporting such a dynamic range of number of ACK/NAK is not desirable from the point of view of the ACK/NAK detection performance. In the following, we present our views on the design of multiple ACK/NAK transmission in TDD.

Table 16 lists the proposed number of supported multiple ACK/NAK bits. For UL subframe associated with only one DL subframe, PUCCH format 1*a* or 1*b* is used to transmit 1 or 2 ACK/NAK bits. For a DL to UL ratio of 9, the number of DL subframes in which a UE is scheduled for unicast transmission is limited to 4. Therefore, the number of supported multiple ACK/NAK bits in a configuration with a DL to UL ratio of 9 is the same as a configuration with a DL to UL ratio of 4.

TABLE 16

| Number of DL subframes associated with One UL subframe | Maximum number of ACK/NAK bits | | | | |
|---|---|---|---|---|---|
| | Non-spatial multiplexing | | Spatial multiplexing | | |
| | Pure Bundling | No Bundling | Pure Bundling | Sub-Bundling | No Bundling |
| 2 | 1 | 2 | 2 | N/A | 4 |
| 3 | 1 | 3 | 2 | 3 | 6 (*) |
| 4 | 1 | 4 | 2 | 4 | 8 (*) |
| 9 | 1 | 4 | 2 | 4 | 8 (*) |

(*) not applicable for concurrent transmission of ACK/NAK and CQI on PUCCH

In Table 16, pure bundling refers to bundling the ACK/NAK bits corresponding to DL data streams across all DL subframes associated with a common UL subframe. This is illustrated in FIG. 3. FIG. 3*a* illustrates an example of pure bundling with non-spatial multiplexing for a DL to UL ratio of 4. FIG. 3*b* illustrates an example of pure bundling with spatial multiplexing for a DL to UL ratio of 4. Note that due to rank adaptation, not all DL subframes have the same number of data streams.

Sub-bundling is applicable for spatial multiplexing with more than 2 DL subframes associated with a common UL subframe. Sub-bundling is performed across spatial codewords, as shown in FIG. 4.

No-Bundling in Table 16 refers the case where all ACK/NAK bits are explicitly transmitted without compression.

For ACK/NAK only transmission, a UE is configured by higher layer such as RRC signaling to one three modes: Pure Bundling; Sub-Bundling; or No Bundling. Generally 2 bits are required for such configuration. If only two modes are supported (Pure Bundling or No Bundling), then only 1 bit is needed because only two modes are supported for non-spatial multiplexing in Table 16.

For concurrent transmission of ACK/NAK and CQI on PUCCH, this invention limits the number of ACK/NAK bits to 4. This ensures sufficient detection performance of ACK/NAK and CQI. Therefore, spatial multiplexing with No Bundling for DL/UL ratios of 3, 4, and 9 are not supported for concurrent transmission of ACK/NAK and CQI. UE configured in the No Bundling mode for ACK/NAK only transmission on PUCCH, must fall back to either pure bundling or sub-bundling when they have concurrent ACK/NAK and CQI to transmit on PUCCH. This fall-back scheme can have a default mode such as always fall-back to pure bundling or sub-bundling. Alternatively, this fall-back scheme can be cell specific or UE specific. If the fall-back scheme is UE specific, additional configuration bits such as 1 bit RRC signaling are needed. If the fall-back scheme is cell-specific, then it can be specified in SIB.

Non-spatial multiplexing UEs configured for No Bundling for ACK/NAK only transmission on PUCCH, may fall back to pure bundling when there are concurrent ACK/NAK and CQI to transmit. Alternatively, non-spatial multiplexing UEs configured for No Bundling for ACK/NAK only transmission on PUCCH do not fall back to pure bundling when there are concurrent ACK/NAK and CQI to transmit. This fall-back scheme for non-spatial multiplexing UEs may be cell specific or UE specific. If the fall-back scheme is UE specific, additional configuration bits such as 1 bit RRC signaling are needed. If the fall-back scheme is cell-specific, then it can be specified in SIB.

For concurrent ACK/NAK and CQI transmission on PUCCH, NAK and DTX share a common state. For a DL subframe in which no DL grant is detected by a UE, NAK (or NAK/NAK) will be transmitted corresponding to the data stream(s) on that DL subframe.

Table 17 shows QPSK mapping used in 3GPP E-UTRA. In some embodiments of the invention b(i) and b(i+1) are ACK/NAK bits. In some embodiments of the invention, either b(i) or b(i+1) or both can be ACK/NAK bit bundles. I is the in-phase and Q is the quadrature modulation components of the QPSK coding. In some notations, whatever is transmitted on Q is multiplied with imaginary unit j. Note that $\sqrt{2}$ factor is for normalization. Table 17 is a permuted version of Table 7. Other permutations are possible.

TABLE 17

| b(i), b(i + 1) | I | Q |
|---|---|---|
| 0, 0 | $1/\sqrt{2}$ | $1/\sqrt{2}$ |
| 0, 1 | $1/\sqrt{2}$ | $-1/\sqrt{2}$ |
| 1, 0 | $-1/\sqrt{2}$ | $1/\sqrt{2}$ |
| 1, 1 | $-1/\sqrt{2}$ | $-1/\sqrt{2}$ |

Subframes are numbered in monotonically increasing order. If the last subframe of a radio frame is k, then first subframe of the next radio frame is k+1.

This invention supports the following combinations of uplink control information on PUCCH: HARQ-ACK using PUCCH format 1a or 1b; and HARQ-ACK using PUCCH format 1b with channel selection. For TDD, two ACK/NAK feedback modes are supported by higher layer configuration. These include: ACK/NAK bundling; and ACK/NAK multiplexing. For TDD UL-DL configuration 5, only ACK/NAK bundling is supported.

TDD ACK/NAK bundling is performed per codeword across M multiple DL subframes associated with a single UL subframe n, where M is the number of elements in the set K defined in Table 18 by a logical AND operation of all the individual PDSCH transmission with and without corresponding physical downlink shared channel (PDSCH) ACK/NAKs and ACK in response to PDCCH transmission indicating downlink SPS release. The bundled first ACK/NAK bit is transmitted using PUCCH format 1a and the bundled second ACK/NAK bit is transmitted using PUCCH format 1b.

For TDD ACK/NAK multiplexing and a subframe n with M>1, where M is the number of elements in the set K defined in Table 18, spatial ACK/NAK bundling across multiple codewords within a DL subframe is performed by a logical AND operation of all the corresponding individual ACK/NAKs and PUCCH format 1b with channel selection is used. For TDD ACK/NAK multiplexing and a subframe n with M=1, spatial ACK/NAK bundling across multiple codewords within a DL subframe is not performed, one ACK/NAK bit is transmitted using PUCCH format 1a or two ACK/NAK bits are transmitted using respective PUCCH format 1a and PUCCH format 1b.

For FDD, the UE shall use PUCCH resource $n_{PUCCH}^{(1)}$ for transmission of HARQ-ACK in subframe n. For a PDSCH transmission indicated by the detection of a corresponding PDCCH in subframe n-4 or for a PDCCH indicating semi-persistent scheduling (SPS) in subframe n-4, the UE uses $n_{PUCCH}^{(1)}=n_{CCE}+N_{PUCCH}^{(1)}$, where $n_{CCE}$ is the number of the first CCE used for transmission of the corresponding DCI assignment and $N_{PUCCH}^{(1)}$ is configured by higher layers.

For TDD ACK/NAK bundling or TDD ACK/NAK multiplexing and a subframe n with M=1 where M is the number of elements in the set K defined in Table 18, the UE uses PUCCH resource $n_{PUCCH}^{(1)}$ for transmission of HARQ-ACK in subframe n. If there is a PDSCH transmission indicated by the detection of corresponding PDCCH or there is a PDCCH indicating downlink SPS release within subframe (s) n-k, where k∈K and K defined in Table 18 is a set of M elements $\{k_0, k_1, \ldots, k_{M-1}\}$ depending on the subframe n and the UL-DL configuration of Table 1, the UE first selects a value p from $\{0, 1, 2, 3\}$ which makes $N_p \le n_{CCE} < N_{p+1}$ and uses $n_{PUCCH}^{(1)}=(M-m-1)\times N_p+m\times N_{p+1}+n_{CCE}N_{PUCCH}^{(1)}$, where $N_{PUCCH}^{(1)}$ is configured by higher layers, $N_p=\max\{0,\lfloor[N_{RB}^{DL}\times(N_{sc}^{RB}\times p-4)]/36\rfloor\}$ and $n_{CCE}$ is the number of the first CCE used for transmission of the corresponding PDCCH in subframe n-$k_m$ and the corresponding m, where $k_m$ is the smallest value in set K such that UE detects a PDCCH in subframe n-$k_m$.

If there is only a PDSCH transmission and not a corresponding PDCCH detected within subframe(s) n-k, where k∈K and K is defined in Table 18, the value of $n_{PUCCH}^{(1)}$ is determined according to higher layer configuration.

TABLE 18

| UL-DL Con- | Subframe n | | | | | | | | | |
|---|---|---|---|---|---|---|---|---|---|---|
| figuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For TDD ACK/NAK multiplexing and sub-frame n with M>1, where M is the number of elements in the set K defined in Table 18, then $n_{PUCCH,i}^{(1)}$ is the ACK/NAK resource derived from subframe n-$k_i$ and HARQ-ACK(i) as the ACK/NAK/DTX response from sub-frame n-$k_i$, where $k_i \in K$ as defined in Table 18 and 0≤i≤M-1 Note that $n_{PUCCH,i}^{(1)}$ corresponds to $h_i$, the ACK/NAK channel for the i-th DL subframe.

For a PDSCH transmission or a PDCCH indicating downlink SPS release in sub-frame n-$k_i$ where $k_i \in K$ the ACK/NAK resource $n_{PUCCH,i}^{(1)}=(M-i-1)\times N_p+i\times N_{p+1}+n_{CCE,i}+N_{PUCCH}^{(1)}$, where p is selected from $\{0, 1, 2, 3\}$ such that $N_p \le n_{CCE} < N_{p+1}$, $N_p=\max\{0,\lfloor[N_{RB}^{DL}\times(N_{sc}^{RB}\times p-4)]/36\rfloor\}$, $n_{CCE,i}$ is the number of the first CCE used for transmission of the corresponding PDCCH in subframe n-$k_i$ and $N_{PUCCH}^{(1)}$ is configured by higher layers.

For a PDSCH transmission where there is not a corresponding PDCCH detected in subframe n-$k_i$, the value of $n_{PUCCH,i}^{(1)}$ is determined according to higher layer configuration.

The UE shall transmit b(0), b(1) on an ACK/NAK resource $n_{PUCCH}^{(1)}$ in sub-frame n using PUCCH format 1b. The value of b(0), b(1) and the ACK/NAK resource $n_{PUCCH}^{(1)}$ are generated by channel selection according to Table 19 for M=2, Table 20 for M=3 and Table 21 for M=4. In Tables 19, 20 and 21 if b(0), b(1) is N/A, then the UE does not transmit an ACK/NAK response in sub-frame n.

Table 19 lists the ACK/NAK transmission multiplexing for M=2.

TABLE 19

| HARQ-ACK(0), HARQ-ACK(1) | $n_{PUCCH}^{(1)}$ | b(0), b(1) |
|---|---|---|
| ACK, ACK | $n_{PUCCH, 1}^{(1)}$ | 1, 1 |
| ACK, NAK/DTX | $n_{PUCCH, 0}^{(1)}$ | 0, 1 |
| NAK/DTX, ACK | $n_{PUCCH, 1}^{(1)}$ | 0, 0 |
| NAK/DTX, NAK | $n_{PUCCH, 1}^{(1)}$ | 1, 0 |
| NAK, DTX | $n_{PUCCH, 0}^{(1)}$ | 1, 0 |
| DTX, DTX | N/A | N/A |

Table 20 lists the ACK/NAK transmission multiplexing for M=3.

TABLE 20

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH, 2}^{(1)}$ | 1, 1 |
| ACK, ACK, NAK/DTX | $n_{PUCCH, 1}^{(1)}$ | 1, 1 |
| ACK, NAK/DTX, ACK | $n_{PUCCH, 0}^{(1)}$ | 1, 1 |
| ACK, NAK/DTX, NAK/DTX | $n_{PUCCH, 0}^{(1)}$ | 0, 1 |
| NAK/DTX, ACK, ACK | $n_{PUCCH, 2}^{(1)}$ | 1, 0 |
| NAK/DTX, ACK, NAK/DTX | $n_{PUCCH, 1}^{(1)}$ | 0, 0 |
| NAK/DTX, NAK/DTX, ACK | $n_{PUCCH, 2}^{(1)}$ | 0, 0 |
| DTX, DTX, NAK | $n_{PUCCH, 2}^{(1)}$ | 0, 1 |
| DTX, NAK, NAK/DTX | $n_{PUCCH, 1}^{(1)}$ | 1, 0 |
| NAK, NAK/DTX, NAK/DTX | $n_{PUCCH, 0}^{(1)}$ | 1, 0 |
| DTX, DTX, DTX | N/A | N/A |

Table 21 lists the ACK/NAK transmission multiplexing for M=4.

TABLE 21

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH, 1}^{(1)}$ | 1, 1 |
| ACK, ACK, ACK, NAK/DTX | $n_{PUCCH, 1}^{(1)}$ | 1, 0 |
| NAK/DTX, NAK/DTX, NAK, DTX | $n_{PUCCH, 2}^{(1)}$ | 1, 1 |
| ACK, ACK, NAK/DTX, ACK | $n_{PUCCH, 1}^{(1)}$ | 1, 0 |
| NAK, DTX, DTX, DTX | $n_{PUCCH, 0}^{(1)}$ | 1, 0 |
| ACK, ACK, NAK/DTX, NAK/DTX | $n_{PUCCH, 1}^{(1)}$ | 1, 0 |
| ACK, NAK/DTX, ACK, ACK | $n_{PUCCH, 3}^{(1)}$ | 0, 1 |
| NAK/DTX, NAK/DTX, NAK/DTX, NAK | $n_{PUCCH, 3}^{(1)}$ | 1, 1 |
| ACK, NAK/DTX, ACK, NAK/DTX | $n_{PUCCH, 2}^{(1)}$ | 0, 1 |
| ACK, NAK/DTX, NAK/DTX, ACK | $n_{PUCCH, 0}^{(1)}$ | 0, 1 |
| ACK, NAK/DTX, NAK/DTX, NAK/DTX | $n_{PUCCH, 0}^{(1)}$ | 1, 1 |
| NAK/DTX, ACK, ACK, ACK | $n_{PUCCH, 3}^{(1)}$ | 0, 1 |
| NAK/DTX, NAK, DTX, DTX | $n_{PUCCH, 1}^{(1)}$ | 0, 0 |
| NAK/DTX, ACK, ACK, NAK/DTX | $n_{PUCCH, 2}^{(1)}$ | 1, 0 |
| NAK/DTX, ACK, NAK/DTX, ACK | $n_{PUCCH, 3}^{(1)}$ | 1, 0 |
| NAK/DTX, ACK, NAK/DTX, NAK/DTX | $n_{PUCCH, 1}^{(1)}$ | 0, 1 |
| NAK/DTX, NAK/DTX, ACK, ACK | $n_{PUCCH, 3}^{(1)}$ | 0, 1 |
| NAK/DTX, NAK/DTX, ACK, NAK/DTX | $n_{PUCCH, 2}^{(1)}$ | 0, 0 |
| NAK/DTX, NAK/DTX, NAK/DTX, ACK | $n_{PUCCH, 3}^{(1)}$ | 0, 0 |
| DTX, DTX, DTX, DTX | N/A | N/A |

What is claimed is:

1. A method of responding in a wireless user equipment (UE) with an acknowledge (ACK) or non-acknowledge (NAK) to a downlink (DL) communication from a base station using frames where at least one uplink (UL) is assigned a subframe to respond to a plurality of DL assigned subframes, comprising the steps of:
generating an ACK response at the UE to each DL communication correctly received;
generating a NAK response at the UE to each DL communication not correctly received;
generating a discontinuous transmittion (DTX) signal at the UE when the UE misses a DL grant in a corresponding DL subframe;
for a UL subframe assigned to respond to communications on plural DL subframes logically combining plural ACK/NAK responses into a single bundled response including any relevant DTX signals, wherein:
the DL communications are transmitted in a single input, multiple output (SIMO) transmission mode;
a single UL subframe is assigned to respond to communications from 9 DL subframes;
said step of logically combining logically combines ACK/NAK responses to DL communications in a first five subframes into a first bit and logically combines ACK/NAK responses to DL communications in a next four subframes into a second bit; and
tranmitting ACK/NAK responses from the UE to the base station including transmitting a bundle response.

2. A method of responding in a wireless user equipment (UE) with an acknowledge (ACK) or non-acknowledge (NAK) to a downlink (DL) communications from abase station using frames where at least one uplink (UL) is assigned a subframe to respond to a plurality of DL assigned subframes, comprising the steps of:
generating an ACK response at the UE to each DL communication correctly received;
generating a NAK response at the UE to each DL communication not correctly received;
generating a discontinuous transmission (DTX) signal at the UE when the UE misses a DL grant in a corresponding DL subframe;
for a UL subframe assigned to respond to communications on plural DL subframes logically combining plural ACK/NAK responses into a single bundled response including any relevant DTX signals; wherein:
the DL communications are transmitted in a single input, multiple output (SIMO) transmission mode;
a single UL subframe is assigned to respond to communications from 9 DL subframes; and
said step of logically combining logically combines ACK/NAK responses to DL communications in a first four subframes into a first bit and logically combines ACK/NAK responses to DL communications in a next five subframes into a second bit; and
transmitting ACK/NAK responses from the UE to the base station including transmitting a bundled response.

3. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising the steps of:
generating an ACK response at the UE to each DL communication correctly received;
generating a NAK response at the UE to each DL communication not correctly received;
generating a discontinuous transmission (DTX) signal at the UE when the UE misses a DL grant in a corresponding DL subframe;
for a UL subframe assigned to respond to communications on plural subframes logically combining plural ACK/NAK responses into a single bundled response including any relevant DTX signals; and transmitting ACK/NAK responses from the UE to the base station including transmitting a bundled response, wherein:

a single UL subframe is assigned to respond to three DL subframes;

said step of logically combining includes generating three bit signals $b_1$, $b_2$ and $b_3$ corresponding to said ACK/NAK responses for said three DL subframes; and said transmitting step includes coding the three bit signals as follows:

| $b_3 b_2 b_1$ | (A/N Channel, QPSK symbol) |
|---|---|
| 0, 0, 0 | $(h_3, Q_1)$ |
| 0, 0, 1 | $(h_3, Q_2)$ |
| 0, 1, 0 | $(h_3, Q_3)$ |
| 0, 1, 1 | $(h_3, Q_4)$ |
| 1, 0, 0 | $(h_2, Q_1)$ |
| 1, 0, 1 | $(h_2, Q_4)$ |
| 1, 1, 0 | $(h_1, Q_1)$ |
| 1, 1, 1 | $(h_1, Q_4)$ or DTX | where: $h_i$ is the ACK/NAK channel associated with the i-th DL subframe; $Q_1$ is −1; $Q_2$ is $\sqrt{-1}$; $Q_3$ is $-\sqrt{-1}$; and $Q_4$ is 1.

4. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising the steps of:

generating an ACK response at the UE to each DL communication correctly received;

generating a NAK response at the UE to each DL communication not correctly received;

generating a discontinuous transmission (DTX) signal at the UE when the UE misses a DL grant in a corresponding DL subframe;

for a UL subframe assigned to respond to communications on plural DL subframes logically combining plural ACK/NAK responses into a single bundle response including any relevant DTX signals; and transmitting ACK/NAK responses from the UE to the base station including transmitting a bundled response, wherein:

a single UL subframe is assigned to respond to three DL subframes;

said step of logically combining includes generating three hit signals $b_1$, $b_2$ and $b_3$ corresponding to said ACK/NAK responses for said three DL subframes; and said transmitting step includes coding the three bit signals as follows:

| $b_3 b_2 b_1$ | (A/N Channel, QPSK symbol) |
|---|---|
| 0, 0, 0 | $(h_3, Q_1)$ |
| 0, 0, 1 | $(h_3, Q_2)$ |
| 0, 1, 0 | $(h_3, Q_3)$ |
| 0, 1, 1 | $(h_3, Q_4)$ |
| 1, 0, 0 | $(h_2, Q_1)$ |
| 1, 0, 1 | $(h_2, Q_4)$ |
| 1, 1, 0 | $(h_1, Q_3)$ |
| 1, 1, 1 | $(h_1, Q_2)$ or DTX | where: $h_i$ is the ACK/NAK channel associated with the i-th DL subframe; $Q_1$ is −1; $Q_2$ is $\sqrt{-1}$; $Q_3$ is $-\sqrt{-1}$; and $Q_4$ is 1.

5. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising the steps of:

generating an ACK response at the UE to each DL communication correctly received;

generating a NAK response at the UE to each DL communication not correctly received;

generating a discontinuous transmission (DTX) signal at the UE when the UE misses a DL grant in a corresponding DL subframe;

for a UL subframe assigned to respond to communications on plural DL subframes logically combining plural ACK/NAK responses into a single bundled response including any relevant DTX signals; and transmitting ACK/NAK responses from the UE to the base station including transmitting a bundled response, wherein:

a single UL subframe is assigned to respond to three DL subframes;

said step of logically combining includes generating three bit signals $b_1$, $b_2$ and $b_3$ corresponding to said ACK/NAK responses for said three DL subframes; and said transmitting step includes coding the three bit signals as follows:

| $b_3 b_2 b_1$ | (A/N Channel, QPSK symbol) |
|---|---|
| 1, 1, 1 | $(h_3, Q_1)$ |
| 1, 1, 0 | $(h_3, Q_2)$ |
| 1, 0, 1 | $(h_3, Q_3)$ |
| 1, 0, 0 | $(h_3, Q_4)$ |
| 0, 1, 1 | $(h_2, Q_1)$ |
| 0, 1, 0 | $(h_2, Q_4)$ |
| 0, 0, 1 | $(h_1, Q_3)$ |
| 0, 0, 0 | DTX | where: $h_i$ is the ACK/NAK channel associated with the i-th DL subframe; $Q_1$ is −1; $Q_2$ is $\sqrt{-1}$; $Q_3$ is $-\sqrt{-1}$; and $Q_4$ is 1.

6. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising the steps of:

generating an ACK response at the UE to each DL communication correctly received;

generating a NAK response at the UE to each DL communication not correctly received;

generating a discontinuous transmission signal at the UE when the UE misses a DL grant in a corresponding DL subframe;

for a UL subframe assigned to respond to communications on plural DL subframes logically combining plural ACK/NAK responses into a single bundled response including any relevant DTX signals; and transmitting ACK/NAK responses from the UE to the base station including transmitting a bundled response, wherein:

a single UL subframe is assigned to respond to three DL subframes;

said step of logically combining includes generating three bit signals $b_1$, $b_2$ and $b_3$ corresponding to said ACK/NAK responses for said three DL subframes; and said transmitting step includes coding the three bit signals as follows:

| $b_3 b_2 b_1$ | (A/N Channel, QPSK symbol) |
|---|---|
| 1, 1, 1 | $(h_3, Q_1)$ |
| 1, 1, 0 | $(h_3, Q_2)$ |
| 1, 0, 1 | $(h_1, Q_1)$ |
| 1, 0, 0 | $(h_3, Q_4)$ |
| 0, 1, 1 | $(h_2, Q_1)$ |
| 0, 1, 0 | $(h_2, Q_4)$ |
| 0, 0, 1 | $(h_1, Q_3)$ |
| 0, 0, 0 | DTX or $(h_1, Q_2)$ or $(h_2, Q_2)$ or $(h_3, Q_3)$ | where: $h_i$ is the ACK/NAK channel associated with the i-th DL subframe; $Q_1$ is $-1$; $Q_2$ is $\sqrt{-1}$; $Q_3$ is $-\sqrt{-1}$; and $Q_4$ is 1.

7. A method of responding in a wireless user equipment (UE) with an acknowledge (ACK) or non-acknowledge (NAK) to a downlink (DL) communications from a base station using, frames where at least one uplink(UL) is assigned a subframe to respond to a plurality of DL assigned subframes, comprising the steps of:
generating an ACK response at the UE to each DL communication correctly received;
generating a NAK response at the UE to each DL communication not correctly received;
generating a discontinuous transmission (DTX) signal at the UE when the UE misses a DL grant in a corresponding DL subframe;
for a UL subframe assigned to respond to communications on plural DL subframes logically combining plural ACK/NAK responses into a single bundled response including any relevant DTX signals; and
transmitting ACK/NAK responses from the UE to the base station including transmitting a bundled response, wherein:
a single UL subframe is assigned to respond to four DL subframes;
said step of logically combining includes generating four bit signals $b_1$, $b_2$, $b_3$ and $b_4$ corresponding to said ACK/NAK responses for said four DL subframes; and
said transmitting step includes coding the four bit signals as follows:

| $b_4 b_3 b_2 b_1$ | (A/N Channel, QPSK symbol) |
|---|---|
| 0, 0, 0, 0 | $(h_2, Q_1)$ |
| 0, 0, 0, 1 | $(h_2, Q_3)$ |
| 0, 0, 1, 0 | $(h_4, Q_1)$ |
| 0, 0, 1, 1 | $(h_4, Q_3)$ |
| 0, 1, 0, 0 | $(h_1, Q_2)$ |
| 0, 1, 0, 1 | $(h_4, Q_2)$ |
| 0, 1, 1, 0 | $(h_1, Q_3)$ |
| 0, 1, 1, 1 | $(h_4, Q_4)$ |
| 1, 0, 0, 0 | $(h_3, Q_1)$ |
| 1, 0, 0, 1 | $(h_3, Q_2)$ |
| 1, 0, 1, 0 | $(h_3, Q_3)$ |
| 1, 0, 1, 1 | $(h_3, Q_4)$ |
| 1, 1, 0, 0 | $(h_2, Q_2)$ |
| 1, 1, 0, 1 | $(h_2, Q_4)$ |
| 1, 1, 1, 0 | $(h_1, Q_1)$ |
| 1, 1, 1, 1 | $(h_1, Q_4)$ or DTX | where: $h_i$ is the ACK/NAK channel associated with the i-th DL subframe; $Q_1$ is $-1$; $Q_2$ is $\sqrt{-1}$; $Q_3$ is $-\sqrt{-1}$; and $Q_4$ is 1.

8. A method of responding in a wireless user equipment (UE) with an acknowledge (ACK) or non-acknowledge (NAK) to a downlink (DL) communication from a base station using frames where at least one uplink (UL) is assigned a subframe to respond to a plurality of DL assigned subframes comprising the steps of:
generating an ACK response at the UE to each DL communication correctly received;
generating a NAK response at the UE to each DL communication not correctly received;
generating a discontinuous transmission (DTX) signal at the UE when the UE misses a DL grant in a corresponding DL subframe;
for a UL subframe assigned to respond to communications on plural DL subframes logically combining plural ACK/NAK responses into a single bundled response including any relevant DTX signals; and
transmitting ACK/NAK responses from the UE to the base station including transmitting a bundled response, wherein:
a single UL subframe is assigned to respond to four DL subframes;
said step of logically combining includes generating four bit signals $b_1$, $b_2 b_3$ and $b_4$ corresponding to said ACK/NAK responses for said four DL subframes; and
said transmitting step includes coding the four bit signals as follows:

| $b_4 b_3 b_2 b_1$ | (A/N Channel, QPSK symbol) |
|---|---|
| 0, 0, 0, 0 | $(h_2, Q_1)$ |
| 0, 0, 0, 1 | $(h_2, Q_4)$ |
| 0, 0, 1, 0 | $(h_4, Q_1)$ |
| 0, 0, 1, 1 | $(h_4, Q_3)$ |
| 0, 1, 0, 0 | $(h_1, Q_2)$ |
| 0, 1, 0, 1 | $(h_4, Q_2)$ |
| 0, 1, 1, 0 | $(h_1, Q_3)$ |
| 0, 1, 1, 1 | $(h_4, Q_4)$ |
| 1, 0, 0, 0 | $(h_3, Q_1)$ |
| 1, 0, 0, 1 | $(h_3, Q_2)$ |
| 1, 0, 1, 0 | $(h_3, Q_3)$ |
| 1, 0, 1, 1 | $(h_3, Q_4)$ |
| 1, 1, 0, 0 | $(h_2, Q_2)$ |
| 1, 1, 0, 1 | $(h_2, Q_3)$ |
| 1, 1, 1, 0 | $(h_1, Q_1)$ |
| 1, 1, 1, 1 | $(h_1, Q_4)$ or DTX | where: $h_i$ is the ACK/NAK channel associated with the i-th DL subframe; $Q_1$ is $-1$; $Q_2$ is $\sqrt{-1}$; $Q_3$ is $-\sqrt{-1}$; and $Q_4$ is 1.

9. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising the steps of:
generating an ACK response at the UE to each DL communication correctly received;
generating a NAK response at the UE to each DL communication not correctly received;
generating a discontinuous transmission (DTX) signal at the UE when the UE misses a DL grant in a corresponding DL subframe;
for a UL subframe assigned to respond to communications on plural DL subframes logically combining plural ACK/NAK responses into a single bundle response including any relevant DTX signals; and transmitting ACK/NAK responses from the UE to the base station including transmitting a bundled response, wherein:

a single UL subframe is assigned to respond to four DL subframes;

said step of logically combining includes generating four bit signals $b_1$, $b_2$, $b_3$ and $b_4$ corresponding to said ACK/NAK responses for said four DL subframes; and said transmitting step includes coding the four bit signals as follows:

| $b_4 b_3 b_2 b_1$ | (A/N Channel, QPSK symbol) |
|---|---|
| 1, 1, 1, 1 | $(h_2, Q_1)$ |
| 1, 1, 1, 0 | $(h_2, Q_4)$ |
| 1, 1, 0, 1 | $(h_4, Q_1)$ |
| 1, 1, 0, 0 | $(h_4, Q_3)$ |
| 1, 0, 1, 1 | $(h_1, Q_2)$ |
| 1, 0, 1, 0 | $(h_4, Q_2)$ |
| 1, 0, 0, 1 | $(h_1, Q_3)$ |
| 1, 0, 0, 0 | $(h_4, Q_4)$ |
| 0, 1, 1, 1 | $(h_3, Q_1)$ |
| 0, 1, 1, 0 | $(h_3, Q_2)$ |
| 0, 1, 0, 1 | $(h_3, Q_3)$ |
| 0, 1, 0, 0 | $(h_3, Q_4)$ |
| 0, 0, 1, 1 | $(h_2, Q_2)$ |
| 0, 0, 1, 0 | $(h_2, Q_3)$ |
| 0, 0, 0, 1 | $(h_1, Q_1)$ |
| 0, 0, 0, 0 | DTX | where: $h_i$ is the ACK/NAK channel associated with the i-th DL subframe; $Q_1$ is $-1$; $Q_2$ is $\sqrt{-1}$; $Q_3$ is $-\sqrt{-1}$; and $Q_4$ is 1.

10. A method of responding in a wireless user equipment (UE) with an acknowledgement (ACK) or non-acknowledge (NAK) to a downlink (DL) communications from a base station using frames where at least one uplink (UL) is assigned a subframe to respond to a plurality of DL assigned subframes, comprising the steps of:

generating an ACK response at the UE to each DL communication correctly received;

generating a NAK response at the UE to each DL communication not correctly received;

generating a discontinuous transmission (DTX) signal at the UE when the UE misses a DL grant in a corresponding DL subframe;

for a UL subframe assigned to respond to communications on plural DL subframes logically combining plural ACK/NAK responses into a single bundled response including any relevant DTX signals, wherein:

a single UL subframe is assigned to respond to two DL subframes;

said step of logically combining includes generating bit signals b(0) and b(1) and selecting an ACK/NAK response channel $n_{PUCCH,1}^{(1)}$ corresponding to said ACK/NAK responses for said two DL subframes as follows:

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NAK/DTX | $n_{PUCCH,0}^{(1)}$ | 0, 1 |
| NAK/DTX, ACK | $n_{PUCCH,1}^{(1)}$ | 0, 0 |
| NAK/DTX, NAK | $n_{PUCCH,1}^{(1)}$ | 1, 0 |
| NAK, DTX | $n_{PUCCH,0}^{(1)}$ | 1, 0 |
| DTX, DTX | N/A | N/A; | and transmitting ACK/NAK responses from the UE to the base station including transmitting a bundled response.

11. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising the steps of:

generating an ACK response at the UE to each DL communication correctly received;

generating a NAK response at the UE to each DL communication not correctly received;

generating a discontinuous transmission (DTX) signal at the UE when the UE misses a DL grant in a corresponding DL subframe;

for a UL subframe assigned to respond to communications on plural DL subframes logically combining plural ACK/NAK responses into a single bundled response including any relevant DTX signals, wherein:

a single UL subframe is assigned to respond to three DL subframes;

said step of logically combining includes generating bit signals b(0) and b(1) and selecting an ACK/NAK response channel $n_{PUCCH,i}^{(1)}$ corresponding to said ACK/NAK responses for said three DL subframes as follows:

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NAK/DTX | $n_{PUCCH,1}^{(1)}$ | 1, 1 |
| ACK, NAK/DTX, ACK | $n_{PUCCH,0}^{(1)}$ | 1, 1 |
| ACK, NAK/DTX, NAK/DTX | $n_{PUCCH,0}^{(1)}$ | 0, 1 |
| NAK/DTX, ACK, ACK | $n_{PUCCH,2}^{(1)}$ | 1, 0 |
| NAK/DTX, ACK, NAK/DTX | $n_{PUCCH,1}^{(1)}$ | 0, 0 |
| NAK/DTX, NAK/DTX, ACK | $n_{PUCCH,2}^{(1)}$ | 0, 0 |
| DTX, DTX, NAK | $n_{PUCCH,2}^{(1)}$ | 0, 1 |
| DTX, NAK, NAK/DTX | $n_{PUCCH,1}^{(1)}$ | 1, 0 |
| NAK, NAK/DTX, NAK/DTX | $n_{PUCCH,0}^{(1)}$ | 1, 0 |
| DTX, DTX, DTX | N/A | N/A; | and transmitting ACK/NAK responses from the UE to the base station including transmitting a bundled response.

12. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising the steps of:

generating an ACK response at the UE to each DL communication correctly received;

generating a NAK response at the UE to each DL communication not correctly received;

generating a discontinuous transmission (DTX) signal at the UE when the UE misses a DL grant in a corresponding DL subframe;

for a UL subframe assigned to respond to communications on plural DL subframes logically combining plural ACK/NAK responses into a single bundled response including any relevant DTX signals, wherein:

a single UL subframe is assigned to respond to four DL subframes;

said step of logically combining includes generating bit signals b(0) and b(1) and selecting an ACK/NAK response channel $n_{PUCCH,i}^{(1)}$ corresponding to said ACK/NAK responses for said four DL subframes as follows:

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NAK/DTX | $n_{PUCCH,1}^{(1)}$ | 1, 0 |
| NAK/DTX, NAK/DTX, NAK, DTX | $n_{PUCCH,2}^{(1)}$ | 1, 1 |
| ACK, ACK, NAK/DTX, ACK | $n_{PUCCH,1}^{(1)}$ | 1, 0 |
| NAK, DTX, DTX, DTX | $n_{PUCCH,0}^{(1)}$ | 1, 0 |
| ACK, ACK, NAK/DTX, NAK/DTX | $n_{PUCCH,1}^{(1)}$ | 1, 0 |
| ACK, NAK/DTX, ACK, ACK | $n_{PUCCH,3}^{(1)}$ | 0, 1 |
| NAK/DTX, NAK/DTX, NAK/DTX, NAK | $n_{PUCCH,3}^{(1)}$ | 1, 1 |
| ACK, NAK/DTX, ACK, NAK/DTX | $n_{PUCCH,2}^{(1)}$ | 0, 1 |
| ACK, NAK/DTX, NAK/DTX, ACK | $n_{PUCCH,0}^{(1)}$ | 0, 1 |
| ACK, NAK/DTX, NAK/DTX, NAK/DTX | $n_{PUCCH,0}^{(1)}$ | 1, 1 |
| NAK/DTX, ACK, ACK, ACK | $n_{PUCCH,3}^{(1)}$ | 0, 1 |
| NAK/DTX, NAK, DTX, DTX | $n_{PUCCH,1}^{(1)}$ | 0, 0 |
| NAK/DTX, ACK, ACK, NAK/DTX | $n_{PUCCH,2}^{(1)}$ | 1, 0 |
| NAK/DTX, ACK, NAK/DTX, ACK | $n_{PUCCH,3}^{(1)}$ | 1, 0 |
| NAK/DTX, ACK, NAK/DTX, NAK/DTX | $n_{PUCCH,1}^{(1)}$ | 0, 1 |
| NAK/DTX, NAK/DTX, ACK, ACK | $n_{PUCCH,3}^{(1)}$ | 0, 1 |
| NAK/DTX, NAK/DTX, ACK, NAK/DTX | $n_{PUCCH,2}^{(1)}$ | 0, 0 |
| NAK/DTX, NAK/DTX, NAK/DTX, ACK | $n_{PUCCH,3}^{(1)}$ | 0, 0 |
| DTX, DTX, DTX, DTX | N/A | N/A; | and
transmitting ACK/NAK responses from the UE to the base station including transmitting a bundled response.

13. A method of responding in a wireless user equipment (UE) with an acknowledge (ACK) or non-acknowledge (NAK) to a downlink(DL) communications from a base station using frames where at least one uplink (UL) is assigned a subframe to respond to a plurality of DL assigned subframes, comprising the steps of:
generating ACK response at the UE to each DL communication correctly received;
generating a NAK response at UE to each DL communication not correctly received;
generating a discontinuous transmission (DTX) signal at the UE when the UE misses a DL grant in a corresponding DL subframe.
for a UL subframe assigned to respond to communications on plural DL subframes logically combining plural ACK/NAK responses into a single bundled responses including any relevant DTX signals, said step of logically combining plural ACK/NAK responses generates a number of ACK/NAK bits as follows:

| Number of DL subframes associated with one UL subframe | Number of ACK/NAK bits | |
|---|---|---|
| | SIMO | MIMO |
| 1 | 1 | 2 |
| 2 | 2 | 4 |
| 3 | 3 | 3 |
| 4 | 4 | 4 |
| 9 | 2 | 4 | wherein the DL communications is capable of operating in one of a single input, multiple output (SIMO) mode or a multiple input, multiple output (MIMO) mode; and
transmitting ACK/NAK responses from the UE to the base station including transmitting a bundled response.

14. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising steps of:
operating the DL communications in a multiple input, multiple output (MIMO) mode;
generating an ACK response at the UE to each communication correctly received;
generating a NAK response at the UE to each DL communication not correctly received;
generating a discontinuous transmission (DTX) signal at the UE when the UE misses a DL grant in a corresponding DL subframe;
for a UL subframe assigned to res and to communications on plural DL subframes logically combining plural ACK/NAK responses into a single bundled response including any relevant DTX signals,
said step of logically combining plural ACK/NAK responses generates a number of ACK/NAK bits as follows:

| Number of DL subframes associated with one UL subframe | Maximum number of ACK/NAK bits | | | |
|---|---|---|---|---|
| | Non-spatial multiplexing | | Spatial multiplexing | |
| | Pure Bundling | No Bundling | Pure Bundling | Spatial Sub-bundling |
| 2 | 1 | 2 | 2 | 2 |
| 3 | 1 | 3 | 2 | 3 |
| 4 | 1 | 4 | 2 | 4 |
| 9 | 1 | 4 | 2 | 4 | where spatial sub-bundling is bundling performed across MIMO codewords per DL subframe; and
transmitting ACK/NAK responses from the UE to the base station including transmitting a bundled response.

15. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes, comprising the steps of:
operating the DL communications in a multiple input, multiple output (MIMO) mode;
generating an ACK response at the UE to each DL communication correctly received;
generating a NAK response at the UE to each DL communication not correctly received;
generating a discontinuous transmission (DTX) signal at the UE when the UE misses a DL grant in a corresponding DL subframe;
for a UL subframe assigned to respond to communications on plural DL subframes logically combining plural ACK/NAK responses into a single bundled response including any relevant DTX signals; said step of logically combining plural ACK/NAK responses generates a number of ACK/NAK bits as follows:

| Number of DL subframes associated with One UL subframe | Maximum number of ACK/NAK bits | | | | |
|---|---|---|---|---|---|
| | Non-spatial multiplexing | | Spatial multiplexing | | |
| | Pure Bundling | No Bundling | Pure Bundling | Sub-Bundling | No Bundling |
| 2 | 1 | 2 | 2 | N/A | 4 |
| 3 | 1 | 3 | 2 | 3 | 6 (*) |
| 4 | 1 | 4 | 2 | 4 | 8 (*) |
| 9 | 1 | 4 | 2 | 4 | 8 (*) |

(*) not applicable for concurrent transmission of ACK/NAK and CQI on PUCCH where spatial sub-bundling is bundling performed across MIMO codewords per DL subframe; and transmitting ACK/NAK responses from the UE to the base station including transmitting a bundled response.

16. A method of responding in a wireless user equipment (UE) with an acknowledge (ACK) or non-acknowledge (NAK) to a downlink (DL) communications from a base station using frames where at least one uplink (UL) is assigned a subframe to respond to a plurality of DL assigned subframes comprising the steps of:

generating an ACK response at the UE to each DL communication correctly received;

generating a NAK response at the UE to each DL communication not correctly received;

generating a discontinuous transmission (DTX) signal at the UE when the UE misses a DL grant in a corresponding DL subframe;

for a UL subframe assigned to respond to communications on plural DL subframes logically combining plural ACK/NAK responses into a single bundled response including any relevant DTX signals, wherein said step of logically combining plural ACK/NAK responses is performed per codeword across M multiple DL subframes associated with a single UL subframe n, where M is the number of elements in the set K defined as:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —; | and transmitting ACK/NAK responses from the UE to the base station including transmitting a bundled response.

* * * * *